| (12) | United States Patent | (10) Patent No.: US 12,261,457 B2 |
| | Gu | (45) Date of Patent: Mar. 25, 2025 |

(54) SYSTEM AND METHOD FOR LOCATION-BASED NODE MANAGEMENT IN A WIRELESS CHARGING NETWORK

(71) Applicant: VISA INTERNATIONAL SERVICE ASSOCIATION, San Francisco, CA (US)

(72) Inventor: Yu Gu, Austin, TX (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 22 days.

(21) Appl. No.: 17/681,404

(22) PCT Filed: Sep. 10, 2019

(86) PCT No.: PCT/US2019/050417
§ 371 (c)(1),
(2) Date: Feb. 25, 2022

(87) PCT Pub. No.: WO2021/050050
PCT Pub. Date: Mar. 18, 2021

(65) Prior Publication Data
US 2024/0039340 A1    Feb. 1, 2024

(51) Int. Cl.
*H02J 50/40* (2016.01)
*H02J 50/12* (2016.01)
*H02J 50/20* (2016.01)
*H02J 50/80* (2016.01)
*G06Q 20/32* (2012.01)

(52) U.S. Cl.
CPC ............ *H02J 50/40* (2016.02); *H02J 50/12* (2016.02); *H02J 50/20* (2016.02); *H02J 50/80* (2016.02); *G06Q 20/3224* (2013.01)

(58) Field of Classification Search
CPC .. H02J 50/80; H02J 50/40; H02J 50/20; H02J 50/50; H02J 3/06; H04W 4/02; H04W 4/021; H04W 4/00; H04W 4/029; H04W 4/24; H04W 12/63; H04W 40/20
See application file for complete search history.

(56) References Cited

U.S. PATENT DOCUMENTS

2010/0277282 A1   11/2010   Kang
2013/0030991 A1*   1/2013   Neidlinger ............ G07F 15/006
                                                        320/114
2013/0249479 A1    9/2013   Partovi
(Continued)

FOREIGN PATENT DOCUMENTS

WO        2021050050 A1    3/2021

OTHER PUBLICATIONS

International Search Report and Written Opinion for corresponding International Application No. PCT/US2019/050417 mailed Dec. 11, 2019.

(Continued)

*Primary Examiner* — Tu X Nguyen
(74) *Attorney, Agent, or Firm* — K&L Gates LLP

(57) ABSTRACT

A plurality of wireless charging systems may be employed within a network at a venue or other physical area to precisely locate a battery-operated node of the network. The location of the node may then be used to manage a transaction between that node and another node within the network when the transaction is associated with that precise location.

20 Claims, 6 Drawing Sheets

(56) References Cited

U.S. PATENT DOCUMENTS

2016/0006264 A1    1/2016   Alpern et al.
2016/0268843 A1    9/2016   Baarman
2019/0118382 A1    4/2019   Gu et al.

OTHER PUBLICATIONS

Supplementary European Search Report for corresponding European Application No. 19945279.8 mail Aug. 26, 2022.

* cited by examiner

SYSTEM AND METHOD FOR LOCATION-BASED NODE MANAGEMENT IN A WIRELESS CHARGING NETWORK

BACKGROUND

The background description provided herein is for the purpose of generally presenting the context of the disclosure. The work of the presently named inventors, to the extent it is described in this background section, as well as aspects of the description that may not otherwise qualify as prior art at the time of filing, are neither expressly nor impliedly admitted as prior art against the present disclosure.

Wireless communication networks are ubiquitous. Data communicated between nodes within wireless networks ranges from personal communication to complex data transfers and data manipulation between the nodes. Several known techniques may be used to determine the physical location of network nodes. For example, cell identification combined with Round Trip Time (RTT), Timing Advance (TA) and Measured Signal level (RX level), Time Difference of Arrival (TDOA) and Angle Of Arrival (AOA) techniques may all be used with varying degrees of accuracy. Some nodes such as smart phones and other computing devices may include Global Positioning System (GPS) capabilities for location determination.

However, each of these techniques suffers drawbacks. For example, non-GPS techniques often rely on two network sites such as cellular towers that can measure and process the delay between signal arrivals, identify the direction of the signal based on a path signature, and determine the distance between the mobile station and the cell towers. GPS location systems a susceptible to errors and only achieve high accuracy after performing a large number of calculations and measurements to remove the error. Furthermore, these methods are significantly degraded when determining the location of an indoor network node.

SUMMARY

The following presents a simplified summary of the present disclosure in order to provide a basic understanding of some aspects of the disclosure. This summary is not an extensive overview. It is not intended to identify key or critical elements of the disclosure or to delineate its scope. The following summary merely presents some concepts in a simplified form as a prelude to the more detailed description provided below.

Loosely-coupled wireless charging systems in a network and associated data may be used to locate mobile computing devices (e.g., smartphones, tablets, and other mobile computing devices having virtual wallet applications, internet access, and/or other capabilities to communicate with and complete purchase transactions with an e-commerce merchant). Data to facilitate locating the mobile computing device may include a time duration for the device to reach a threshold charge from zero charge using several wireless charging systems and a response time for the device to indicate reaching the threshold charge to the plurality of wireless charging systems. A distance between the charger and the device may be estimated using a known location of the wireless charger, and a time duration for the battery to be charged from zero to a threshold (e.g., a battery voltage that enables the mobile computing device to respond to the wireless charger). From multiple wireless chargers (e.g., at least four for three-dimensional space), trilateration may be used to determine a three-dimensional location of the mobile computing device. With this known location, a backend payment server or other system may manage the network node (e.g., the mobile computing device) to facilitate a location-based transaction (e.g., stadium, theater and other venue seating, media content pushing to the device, etc.) using an electronic wallet, browser, or other application on the mobile computing device.

A processor-implemented method may manage a transaction between nodes of a system including a plurality of wireless charging systems. For example, the method may receive, by a processor of a network server, charging data corresponding to a mobile computing device. The charging data may include charging data corresponding to a mobile computing device. The charging data may also include an elapsed time for a communication module of the mobile computing device to reach a threshold level and to send a response to the plurality of wireless charging systems in response to reaching the threshold level. The method may also determine, by the processor of the network server, a location of the mobile computing device based on a location for each of the plurality of wireless charging systems, and a relationship between the elapsed time and the threshold level. The method may then send, by the processor of the network server, the location of the mobile computing device to a node of the system to manage a location-based transaction between the mobile computing device and the node of the system based on the location of the mobile computing device. The mobile computing device may be coupled to the plurality of wireless charging systems.

A system may manage a transaction between nodes of the system including a plurality of wireless charging systems. The system may include a processor and a memory in communication with the processor, the memory storing instructions, that when executed by the processor, cause the processor to manage the transaction. In some embodiments, the instructions may cause the processor to receive charging data corresponding to a mobile computing device. The charging data may include charging data corresponding to a mobile computing device. The charging data may also include an elapsed time for a communication module of the mobile computing device to reach a threshold level (e.g., a battery voltage that enables the mobile computing device to respond to the wireless charger) and to send a response to the plurality of wireless charging systems in response to reaching the threshold level. Further instructions may send the location of the mobile computing device to a node of the system to manage a location-based transaction between the mobile computing device and the node of the system based on the location of the mobile computing device. The mobile computing device may be coupled to the plurality of wireless charging systems.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

Figure 1:
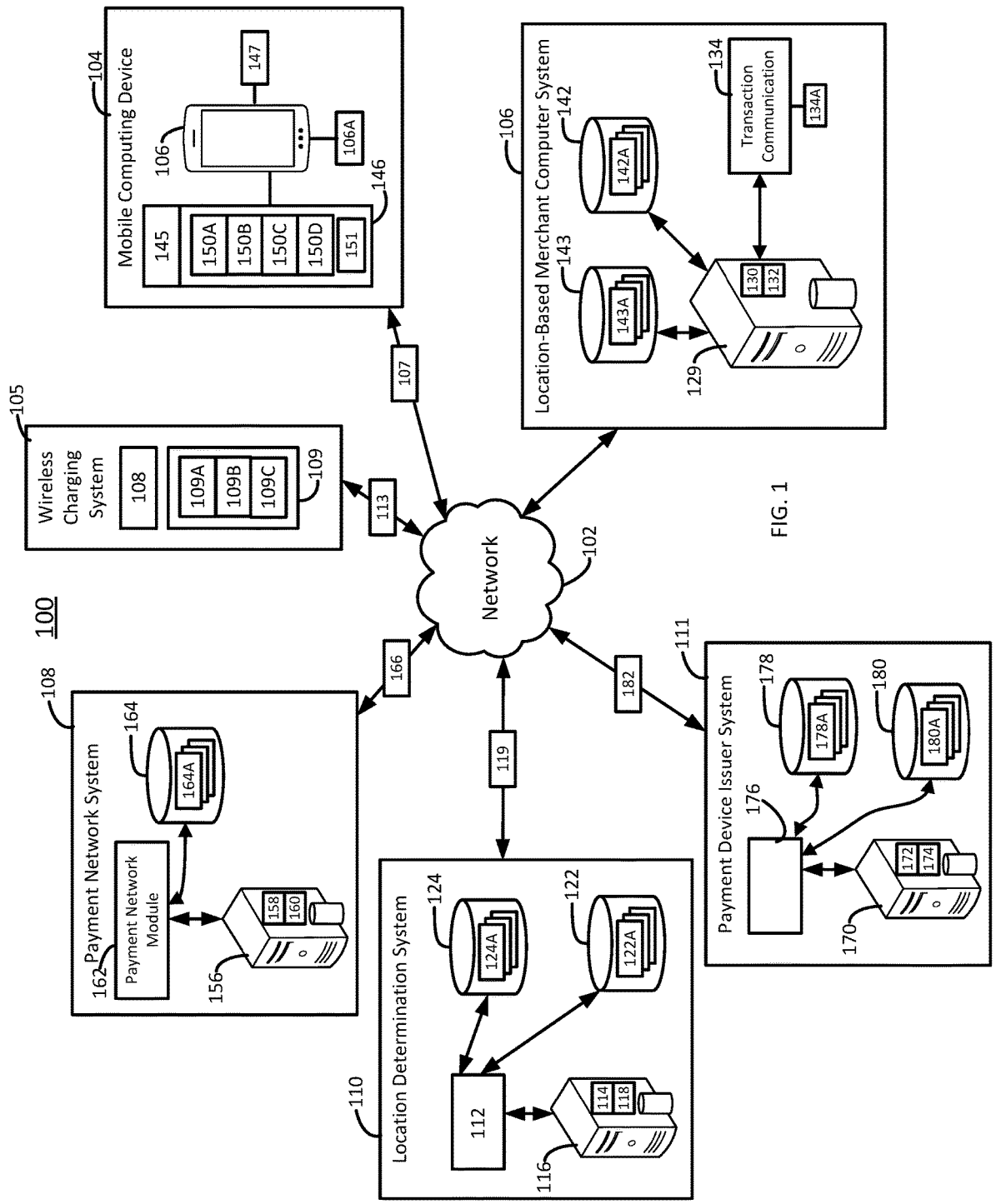
FIG. 1 shows an illustration of an exemplary system for managing nodes in a wireless charging network.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

DETAILED DESCRIPTION

The embodiments described herein may describe a technical solution to the technical problem of location-based node management in a wireless charging network. The embodiments described herein solve this problem by employing data from a plurality of wireless charging systems within a venue to precisely locate a mobile computing device and then facilitate a transaction that is associated with that precise location. For example, the embodiments may be used to facilitate seat-based pricing within a theater or other venue as the location data may be used to determine an exact seat at which the mobile computing device is present. Also, the precise location may be used to push media or other content associated with the same location to the device.

Battery-operated electronic devices may be charged wirelessly at a distance using several methods. For example, induction techniques use alternating current in a wire loop to generate an alternating magnetic field to induce an alternating current in a nearby secondary coil. If the secondary coil is integrated into the battery of an electronic device, the secondary coil may charge the battery of that device. The separation, alignment and sizes of the coils have a significant influence on the efficiency of the energy transfer and practical induction systems typically achieve about 30-60% efficiency. The "Qi" standard is one example of wireless power transfer using inductive charging over distances of up to four centimeters. Resonant charging techniques are able to charge batteries using induction, but may do so at a greater distance. In a resonant charging system, the coils operate at resonant frequencies. The oscillating magnetic field generated by the primary coil induces a current in the secondary coil. But, because resonant coils are strongly coupled, the current may be induced even when separated by a meter or more. AirFuel™ Resonant is one example of resonant charging technology. Further embodiments may employ radio frequency (RF) wireless charging technology. RF wireless charging uses electronic waves or radio frequencies rather than magnetic fields to charge a device. In an RF charging system, an RF transmitter transmits RF waves and a receiver embedded within a device receives them. The receiver then converts the RF waves into electricity to power and charge the device. RF wireless charging technology includes far field and near field. Far Field emits electronic waves and the transmitter (similar to a router network device) locates the RF receiver in a defined area. Near field allows any small enclosed space, like a drawer or box, to become a transmitter/charging station. The device is placed inside the enclosed space and is charged. Of course, may facilities may employ a combination of the various loosely coupled wireless charging technologies and other loosely coupled wireless charging techniques may be able to charge battery-operated electronic devices at a distance.

FIG. 1 generally illustrates one embodiment of a system 100 for location-based node management in a wireless charging network. The system 100 may include a computer network 102 that links one or more systems and computer components. In some embodiments, the system 100 includes a mobile computing device 104, a wireless charging system 105, a location-based merchant computer system 106, a payment network system 108, a location determination system 110, and a payment device issuer system 111.

The network 102 may be described variously as a communication link, computer network, internet connection, etc. The system 100 may include various software or computer-executable instructions or components stored on tangible memories and specialized hardware components or modules that employ the software and instructions in a practical application to manage network nodes for a location-based transaction via a wireless charging system 105, as described herein.

The various modules may be implemented as computer-readable storage memories containing computer-readable instructions (i.e., software) for execution by one or more processors of the system 100 within a specialized or unique computing device. The modules may perform the various tasks, steps, methods, blocks, etc., as described herein. The system 100 may also include both hardware and software applications, as well as various data communications channels for communicating data between the various specialized and unique hardware and software components.

Networks are commonly thought to comprise the interconnection and interoperation of hardware, data, and other entities. A computer network, or data network, is a digital telecommunications network which allows nodes to share resources. In computer networks, computing devices exchange data with each other using connections, e.g., data links, between nodes. Hardware networks, for example, may include clients, servers, and intermediary nodes in a graph topology (e.g., the mobile computing device 104, the wireless charging system 105, the location-based merchant computer system 106, the payment network system 108, the location determination system 110, and the payment device issuer system 111). In a similar fashion, data networks may include data nodes in a graph topology where each node includes related or linked information, software methods, and other data. A node such as the mobile computing device 104 may be managed to facilitate location-based transactions with other nodes of the system (e.g., the location-based merchant computer system) based on the data and instructions of various other nodes of the system 100 (e.g., the wireless charging system 105, etc.).

It should be noted that the term "server" as used throughout this application refers generally to a computer, other device, program, or combination thereof that includes a processor and memory to process and respond to the requests of remote users/nodes across a communications network. Servers send their information to requesting "clients." The term "client" as used herein refers generally to a computer, program, other device, user and/or combination thereof that is capable of processing and making requests and obtaining and processing any responses from servers across a communications or data network. A computer, other device, set of related data, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The mobile computing device 104 may include a smartphone 106 or other computing device capable of sending and receiving a wireless digital communication. The mobile computing device may include a processor 145, a memory 146, and a battery 147. The mobile computing device 106 may include an RFID tag 106A or other device capable of sending a radio signal including mobile computing device data such as a device manufacturer, an elapsed time to reach a threshold battery charge level for the device communication module 150C to be sufficiently charged to enable it to respond to the wireless battery charging system 105. The memory 146 of the mobile computing device 104 may include various modules including instructions that, when executed by the processor 145 control the functions of the mobile computing device 104 generally and integrate the mobile computing device into the system 100 in particular. For example, some modules may include an operating system 150A, a browser module 150B, a communication module 150C, and a wallet module 150D. The communication module 150C may include processor-executable instructions to send and/or receive a signal from contactless component of the system 100 such as the wireless charging system 105. In some embodiments, the communication module 150C may include an RFID receiver or instructions to implement an RFID receiver. The wallet module 150D may also include payment device data 151. The payment device data 151 may securely identify a payment device 200 (FIG. 2) and a user's payment account information to facilitate a transaction between the mobile computing device 104 and the location-based merchant computer system 106. In some embodiments, the payment device data 151 may be tokenized such that only a trusted partner may access the payment device data 151. The wallet module 105D may also include instructions to send the charging data 113

The wallet module or other modules of the mobile computing device 106 may include instructions to facilitate management of nodes in a wireless charging network based on its location and to facilitate location-based transactions. For example, the module 150D may include instructions to send and receive charging data 113. The module 150D may include instructions to monitor a connection time for when the device 104 begins charging with a loosely-coupled wireless battery charging system (e.g., the system 105). Instructions may also include sending an elapsed time for the device 104 to reach a threshold battery charge level 107 for the device communication module 150C to be sufficiently charged to enable it to respond to the wireless battery charging system 105 to another component of the system 100 (e.g., the location determination system 110). In further embodiments, the module 105D may include instructions to send the charging data 113 periodically, at a threshold charge level, or at other times or conditions. The threshold charge level may include a voltage of the battery 147 for the device communication module 150C to be sufficiently charged to enable it to respond to the wireless battery charging system 105, a voltage that is needed to turn on the device 104, a charge level for the device 104 to go from a "low power mode" to a regular power mode, a voltage required to complete a transaction between the device 104 and the location-based merchant computer system, or simply a charge at a second time compared to the charge at a first time. In some embodiments, a plurality of wireless charging systems 105 (e.g., within a theater or other performance venue) may receive the elapsed time to reach the threshold battery charge level 107. In other embodiments, the location determination system 110 may receive the charging data 113 for the mobile computing device 104 from the mobile computing device 104.

The wireless charging system 105 may also include a processor 108 and a memory 109. While the system 100 of FIG. 1 illustrates one wireless charging system 105, the system 100 may include several systems 105 that each connect to and charge the mobile computing device 104 simultaneously. Additionally, data indicating a mobile computing device threshold battery charge level 107 for the device communication module 150C to be sufficiently charged to enable it to respond to the wireless battery charging system 105, and an elapsed time to achieve that level may be used to accurately locate a mobile computing device 104 as herein described. The processor 108 may execute processor-executable instructions stored in the memory 109. The memory 109 of the wireless charging system 105 may include various modules including instructions that, when executed by the processor 108 control the functions of the wireless charging system 105 generally and integrate the wireless charging system 106 into the system 100 in particular to facilitate location-based management of a network node (e.g., the mobile computing device 104 and the wallet module 150D) in a wireless charging network. For example, some modules may include a charging module 109A, a communication module 109B, and a coordination module 109C. The modules 109A, 109B, 109C may include instructions to facilitate management of nodes in a wireless charging network based on the node location and to facilitate location-based transactions between the nodes as herein described. In some embodiments, the modules may include instructions to send charging data 113 of the system 105 to one or more other components of the system 100. The charging data 113 may include a manufacturer of the mobile computing device 104 that is used to determine the threshold battery charge level 107. For example, the charging data 113 of the wireless charging system(s) 105 may include a charging output of the system 105 (e.g., in milliwatts, "mW", or other notation of electrical power), an elapsed time for the device communication module 150C to be sufficiently charged to enable it to respond to the wireless battery charging system 105, the difference between the battery charge of the node (e.g., the mobile computing device 104) between the first and second time periods when the device 104 is connected to a plurality of wireless charging systems 105, and other data to both determine a location of the mobile computing device 104 or other components of the system 100. The elapsed time for the device communication module 150C to be sufficiently charged to enable it to respond to the wireless battery charging system 105 may be used by the location determination system 110 to determine an accurate location of the mobile computing device 104 within an area including multiple wireless charging systems 105. In other embodiments, a charging power output of the wireless charging system 105 may be used to determine a distance to a mobile computing device 104. For example, as the distance between the wireless charging system 105 and the mobile computing device 104 increases, the power output received by the mobile computing device 105 will decrease. Thus, a power output from the wireless charging system 105 to a particular battery-operated mobile computing device 104 may indicate a distance to the device 104.

The coordination module 109C may include instructions to communicate charging data 113 with other wireless charging systems 105 that are also charging a particular mobile computing device 104. For example, when a mobile computing device 104 is connected to two or more wireless charging systems 105, the coordination module 109C may cause the processor 108 to execute instructions to share charging data 113, threshold battery charge level 107, and other data related to the charging actions of the wireless charging system 105 with other nodes of the system 100 (e.g., other wireless charging systems 105, the location determination system 110, etc.) such that multiple wireless charging systems 105 may charge a single mobile computing device 104. Charging data 113 may also include an identification of the mobile computing system 104, a charging power output of each of the multiple wireless charging systems 105 connected to the particular mobile computing device 104, elapsed times for the device communication module 150C to be sufficiently charged to enable it to respond to the wireless battery charging system 105, a location of the mobile computing device 104, etc.

The merchant computer system 106 may include a computing device such as a merchant server 129 including a processor 130 and memory 132 including components and instruction modules including processor-executable instructions to facilitate transactions with the mobile computing device 104 via other entities of the system 100. In some embodiments, the memory 132 may include a transaction communication module 134. The transaction communication module 134 may include instructions to send merchant messages 134A to other entities (i.e., 104, 105, 108, 110, 111) of the system 100 to indicate a transaction has been initiated with the mobile computing device 104 generally and wallet module 150D in particular including payment account data, location data 119, and other data as herein described. For example, a node of the system 100 (e.g., the mobile computing device 104 generally and the browser module 150B in particular) may access a location-based merchant website 144 to initiate a location-based transaction. Some examples of location-based transactions include ticket sales for specific seats at a venue, The merchant computer system 106 may also include a transaction repository 142 and instructions to store payment and other transaction data 142A within the transaction repository 142. The merchant computer system 106 may also include a product repository 143 and instructions to store product and other data 143A within the product repository 143. In some embodiments, the merchant computer system 106 may also include instructions to send payment device data 151 corresponding to the payment device 200 (FIG. 2), transaction data 143A, and/or product data 143B and other data it received during a transaction to the payment network system from the mobile computing device 104.

The payment network system 108 may include a payment server 156 including a processor 158 and memory 160. The memory 160 may include a payment network module 162 including instructions to facilitate payment between parties (e.g., one or more users, merchants, etc.) using the system 100. The module 162 may be communicably connected to an account holder data repository 164 including payment network account data 164A. The payment network account data 164A may include any data to facilitate payment and other funds transfers between system entities (e.g., 104, 105, 106, 110, and 111). For example, the payment network account data 164A may include identification data, account history data, payment device data, etc. The module 162 may also include instructions to send payment messages 166 to other entities and components of the system 100 in order to complete location-based transactions between the mobile computing system 104 and the location-based merchant computer system 106. For example, the module 162 may include instructions to send a payment message 166 to a payment device issuer system 111 or other entity of the system 100 to complete a location-based purchase transaction. The message 166 may include data to authorize a purchase transaction such as an authorization number or other identification, and may be tokenized or encrypted by the system 100 before the message 166 is sent over the network 102 to a system entity.

A payment device issuer system 111 may include a payment device issuer server 170 including a processor 172 and memory 174. The memory may include a payment device issuer module 176 including instructions to facilitate payment to the merchant computer system 106 using the system 100. The module 176 may be communicably connected to an issuer transaction data repository 178 including issuer transaction data 178A. The issuer transaction data 178A may include data to facilitate execution by the processor 172 of instructions included with the payment device issuer module 176 to facilitate payment and other funds transfers to/from the location-based merchant computer system 106 and to/from the payment device issuer system 111. In some embodiments, the module 176 may include instructions to transfer funds corresponding to a location-based purchase transaction upon receiving a payment message 166 from the payment network system 108. For example, the module 176 may include instructions to send an issuer message 182 including data and/or further instructions to the location-based merchant computer system 106 that implement or indicate a funds transfer corresponding to a location-based purchase transaction. The issuer transaction data 178A may include merchant identification data, user account history data, etc. The module 176 may also be communicably connected to a cardholder account data repository 180 including cardholder account data 180A. The module 176 may also include instructions to receive payment messages 166 from the payment network system 108 in order to manage nodes of the system 100 and complete transactions between users and/or merchants and better manage user and merchant funds account balances to complete location-based transactions.

Figure 5:
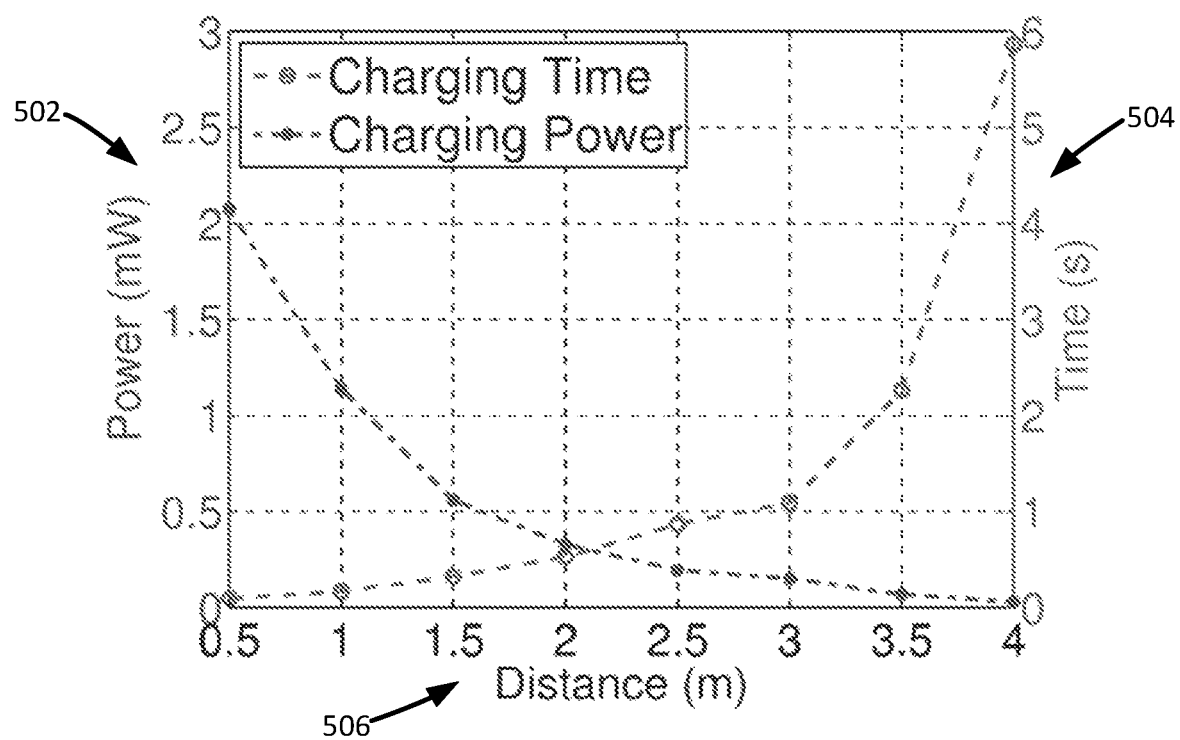
FIG. 5 is an exemplary graph showing a relationship between charging time, charging power, and distance in the network of FIG. 1 for a wireless charging system.

The location determination system 110 may include one or more instruction modules including a location module 112 that, generally, may include instructions to cause a processor 114 of a location server 116 to functionally communicate with a plurality of other computer-executable steps or sub-modules, and components of the system 100 via the network 102 to facilitate location-based transactions with other nodes of the system (e.g., the location-based merchant computer system 106, the mobile computing device 104, etc.) based on the data and instructions of various other nodes of the system 100 (e.g., the wireless charging system 105, etc.). For example, location module 112 may include instructions to determine a distance to a mobile computing device 104 from a wireless charging system 105. In some embodiments, the instructions may cause a processor of the location determination system 110 to compare an elapsed time to reach a threshold battery charge level 107 to a mapping (FIG. 5) of the relationship between the charging power received at the device 104 and a time to reach the threshold battery charge level 107 to determine the distance between the mobile computing device 104 and the wireless charging system 105. In further embodiments, the location module 112 may include instructions to determine the distance to the mobile computing device 104 from a plurality of wireless charging systems 105 and, using trilateration, determine the three-dimensional location 119 of the mobile computing device 104. A first data repository 122 may store payment network transaction data 122A for all entities of the system 100. In some embodiments, further data repositories may correspond to different types of payment network transaction data 122A or subcomponents of the payment network transaction data 122A (e.g., a location for a location-based purchase transaction, a merchant, an account holder, a transaction region, transaction type, a time of day, a merchant and/or customer type, a physical device identification, a payment device type, a transaction amount, cardholder name, cardholder account number, and other payment network account data 164A, etc.).

Various other data 124A may be received and/or derived by the location determination system 110 and stored in a second data repository 124 and used by the system 100 as described herein. For example, the second data repository may be used to store electronic wallet transaction details 124A from an electronic wallet system and the wallet module 150D or other methods of electronic or computer-based payment.

Figure 2A:
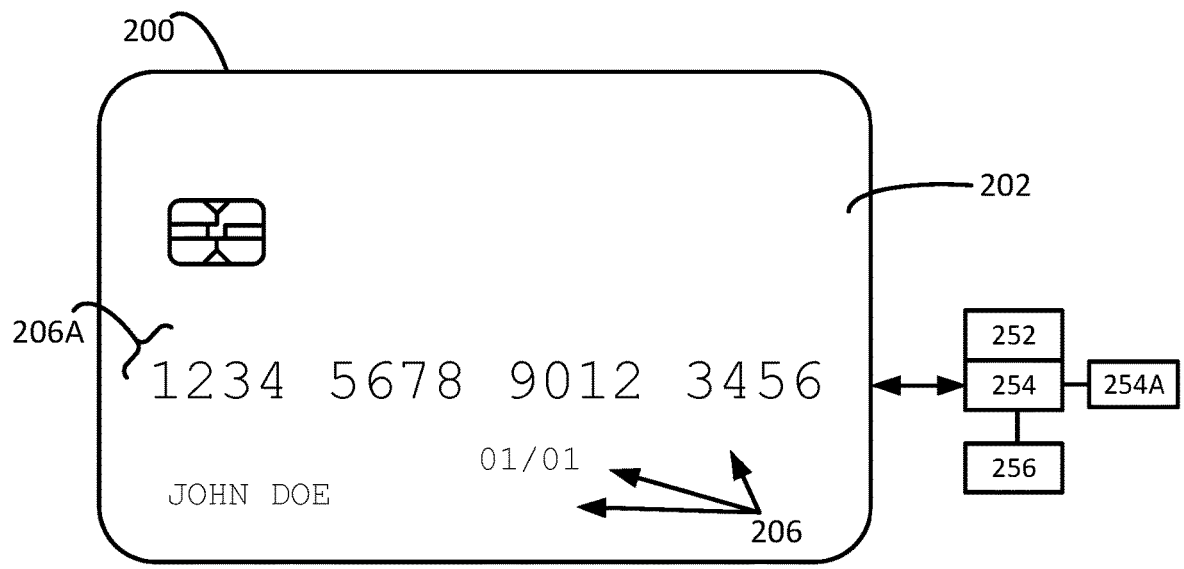
FIG. 2A shows a first view of an exemplary payment device for use with the system of FIG. 1.
Figure 2B:
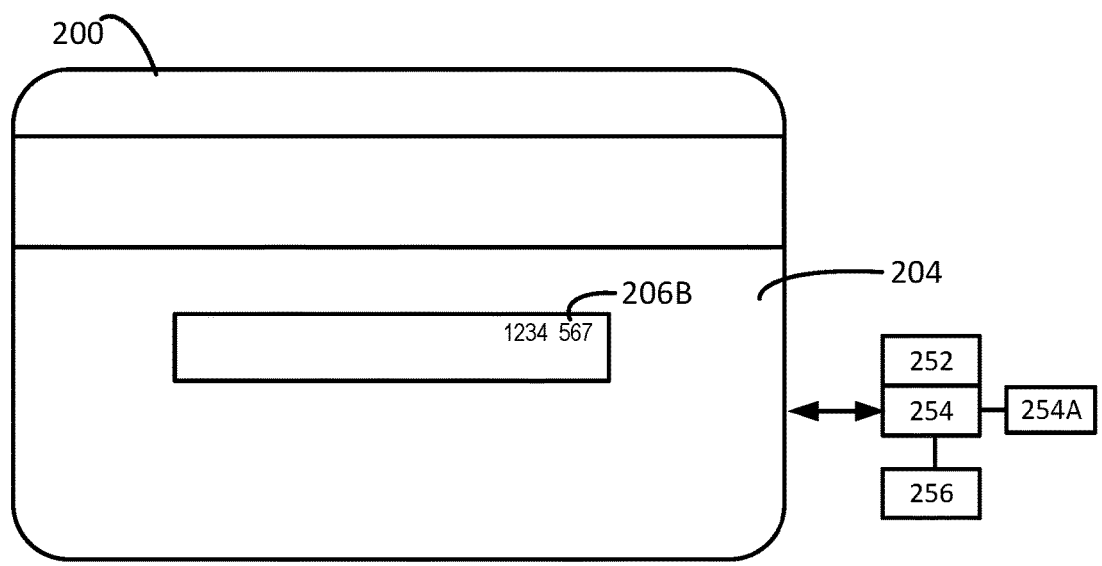
FIG. 2B shows a second view of an exemplary payment device for use with the system of FIG. 1.

With reference to FIGS. 2A and 2B, an exemplary payment device 200 may take on a variety of shapes and forms. In some embodiments, the payment device 200 is a traditional card such as a debit card or credit card. In other embodiments, the payment device 200 may be a fob on a key chain, an NFC wearable, or other device. In other embodiments, the payment device 200 may be an electronic wallet (e.g., the wallet module 150D) where one account from a plurality of accounts previously stored in the wallet (e.g., payment device data 151) is selected and communicated to the system 100 to execute the location-based transaction. The payment device 200 is able to communicate securely with the system 100 and its components. Many legacy payment devices may have to be read by a magnetic stripe reader and thus, the payment device 200 may have to be sized to fit through a magnetic card reader. In other examples, the payment device 200 may communicate through near field communication or other contactless form of communication. The payment device may include a Radio-Frequency Identification (RFID) tag 252 that is capable of being read by the wireless charging system 105.

Physically, the payment device 200 may be a card and the card may have a plurality of layers to contain the various elements that make up the payment device 200. In one embodiment, the payment device 200 may have a substantially flat front surface 202 and a substantially flat back surface 204 opposite the front surface 202. Logically, in some embodiments, the surfaces 202, 204 may have some embossments 206 or other forms of legible writing including a personal account number (PAN) 206A and the card verification number (CVN) 206B. In some embodiments, the payment device 200 may include data corresponding to the primary account holder, such as payment network account data 164A for the account holder. A memory 254 generally and a module 254A in particular may be encrypted such that all data related to payment is secure from unwanted third parties. A radio-frequency identification (RFID) tag 252 may be communicably coupled to a communication interface 256. The communication interface 256 may include instructions to facilitate sending payment device data 151, a payment payload, a payment token, account identification, etc., or other data to identify the payment device 200 to one or more components of the system 100 via the network 102. In further embodiments, the communication interface 256 may be communicably coupled to the mobile computing device 104 and the wallet module 150D to facilitate location-based node management in a wireless charging network as herein described. For example, the communication interface 256 may include instructions to interface with the mobile computing device 104 generally and the wallet module 105D in particular to facilitate transactions employing the payment device 200.

Figure 3:
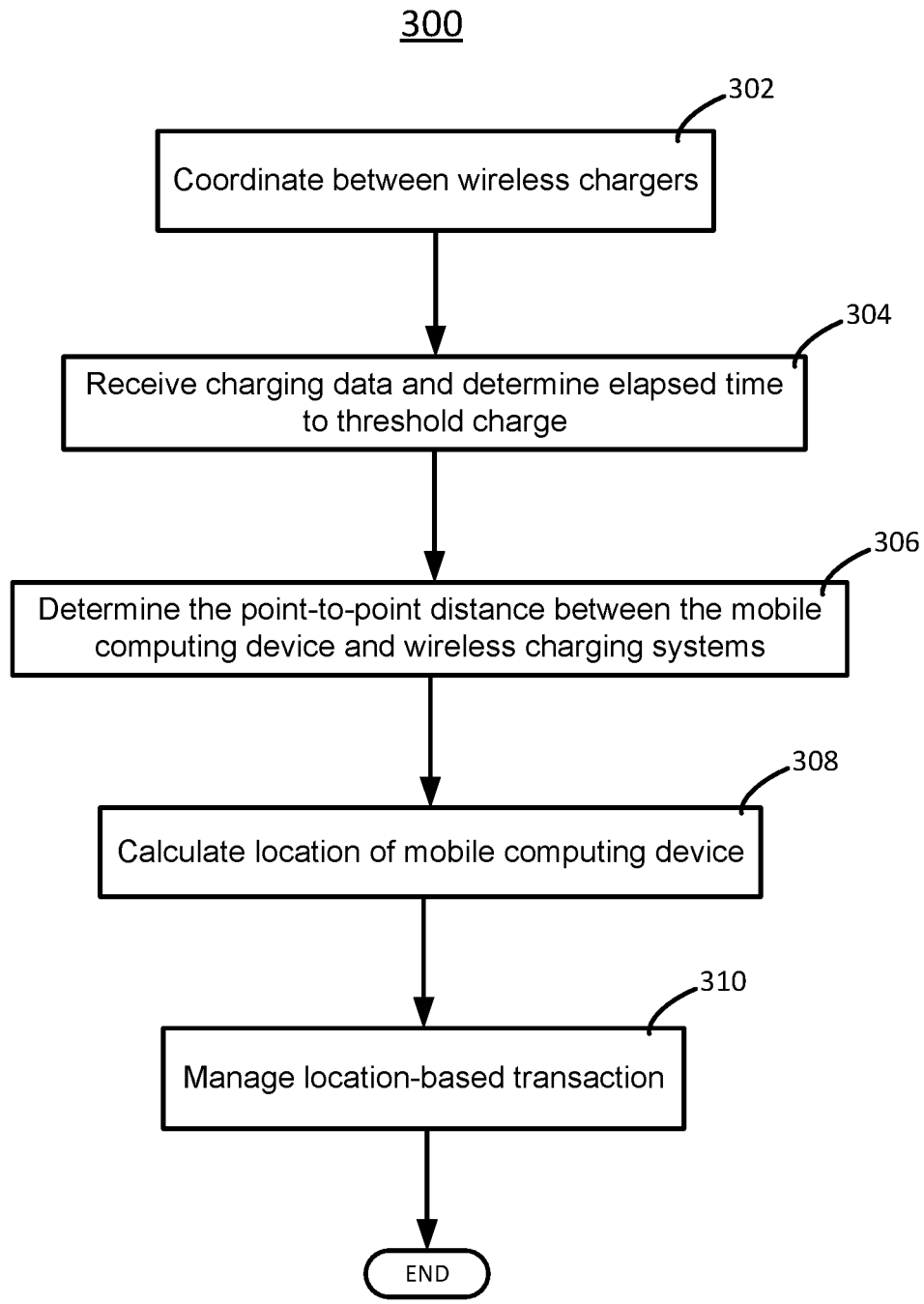
FIG. 3 is a flowchart of a method for managing nodes in a wireless charging system.

With reference to FIG. 3, a method 300 may manage nodes in a system 100 including a network 102 with a plurality of wireless charging systems 105 by facilitating location-based transactions between nodes on the network 102. Each step of the method 300 is one or more computer-executable instructions (e.g., modules, blocks, steps, stand-alone or sequences of instructions, etc.) performed on a processor of the system 100 or other computing device corresponding to components of the system (e.g., a mobile computing device 104, a wireless charging system 105, a location-based merchant computer system 106, a payment network system 108, a location determination system 110, and a payment device issuer system 111, or other computer system illustrated in FIG. 1 and/or described herein) which may be physically configured to execute the different aspects of the method. Each step may include execution of any of the instructions as described in relation to the method 300 and system 100 as part of the network management systems and methods described herein or other component that is internal or external to the system 100. While the below blocks are presented as an ordered set, the various steps described may be executed in any particular order to complete the methods described herein.

At block 302, the method 300 may coordinate between multiple wireless charging systems 105 to charge a battery 147 of a node of the system 100 (e.g., the mobile computing device 104). In some embodiments, the method 300 may record a connection time for the connection between the device 104 and the charging system 105. The method 300 may also send and/or receive charging data 113 among multiple other nodes of the system 100 (e.g., multiple wireless charging systems 105, the location determination system 110, etc.). The method 300 may send and/or receive the charging data 113 to/from other system nodes periodically, at a threshold battery charge level 107, etc. In further embodiments, the charging data 113 may include an identification of a mobile computing device 104 that is currently being charged by the system 105 along with a corresponding charging power output of the system 105 at a first time and the battery charge of the device 104 at that first time. Then, after a period of time has elapsed, a charging threshold is met, or other measurement, the method may continue to coordinate between the multiple wireless charging systems 105 by sending the charging data 113 at a second, later time. The elapsed time between the first time and the second time for sending the charging data 113 may be any period where a battery 147 increases its charge as a result a connection between the mobile computing device 104 and one or more wireless charging systems 105. Charging data may also include an identification and a location of the wireless charging system 105. In some embodiments, the method 300 may cause the wallet module 150D of the mobile computing device 104 to send the charging data 113 and other data to the location determination system 110.

Figure 4:
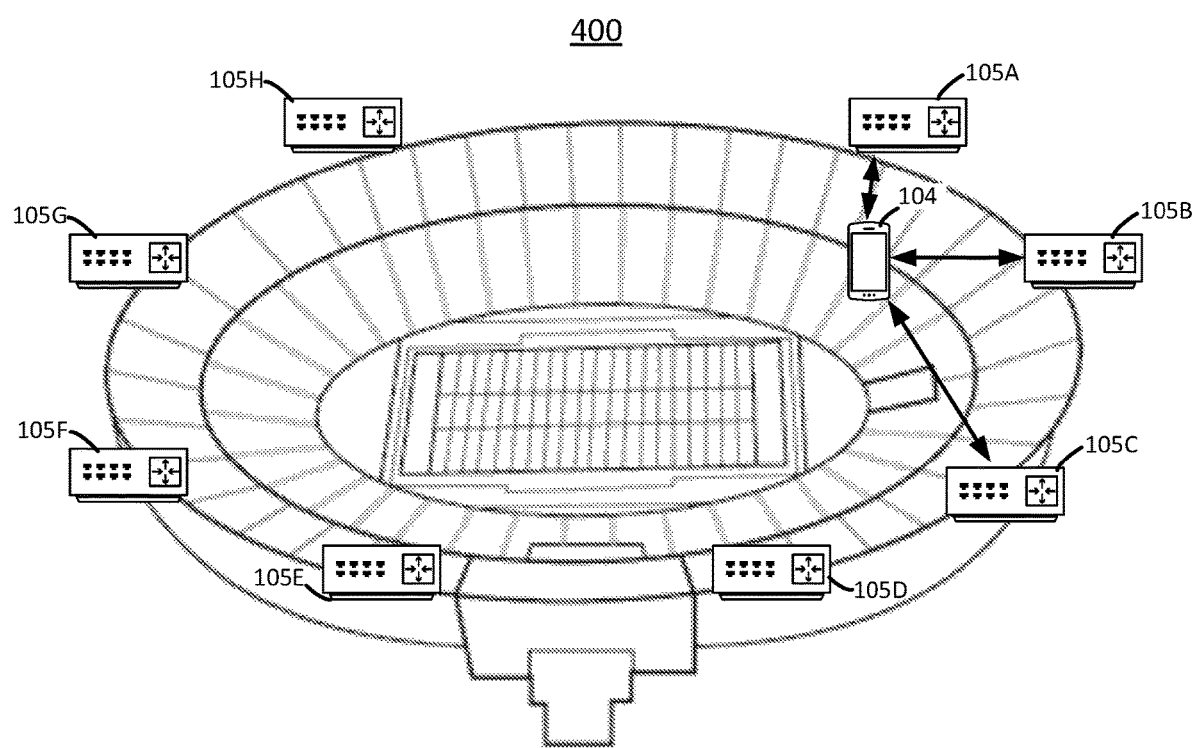
FIG. 4 is an exemplary venue including multiple wireless charging systems for managing nodes of the network to facilitate the embodiments described herein.

With reference to FIG. 4, a venue 400 may include a plurality of wireless charging systems (e.g., 105A, 105B, 105C, 105D, 105E, 105F, 105G, 105H, etc.). It should be noted that, while the venue 400 of FIG. 4 includes eight wireless charging systems 105, other venues may include a greater or fewer number of systems 105 to implement the embodiments described and claimed herein. A mobile computing device 104 including a battery 147 may connect to a plurality of wireless charging systems 105 (e.g., 105A, 105B, 105C, etc.). Each wireless charging system 105A, 105B, 105C may coordinate with the other wireless charging systems as described at block 302.

Returning to FIG. 3, at block 304, the location determination system 110 may receive, for a single mobile computing device 104, the charging data 113 including a response to the wireless charging system 105 indicating that the battery 147 has been sufficiently charged to the threshold battery charge level 107 so that the communication module 150C is able to send the data 113 to the system 105. Block 304 may also include determining an elapsed time for the battery 147 to reach the threshold battery charge level 107. The charging data 113 may include an indication of the threshold battery charge level 107.

At block 306, the method 300 may determine a point-to-point distance between the wireless charging system(s) (e.g., 105A, 105B, 105C) and the mobile computing device 104. With brief reference to FIG. 5, a graph 500 illustrates a relationship between power output 502 of the wireless charging system 105, a time to achieve a threshold battery charge level 107 of the mobile computing device 104 that is connected to the wireless charging system 105, and a distance 506 between the mobile computing device 104 and the wireless charging system 105. As shown, as distance 506 increases, the power output 502 of the wireless charging system 105 decreases, while the time 504 to achieve a threshold battery charge level 107 increases. Using this relationship, the location module 112 of the location determination system 110 may execute instructions to determine the point-to-point distance between the wireless charging system(s) (e.g., 105A, 105B, 105C) and the mobile computing device 104 based on the charging data 113. An advantage to using the charging time 504 for this location determination, rather than RF communication trip times, GPS, and other location techniques, is that the time 504 for the connected battery 147 of the mobile computing device 104 to achieve the threshold battery charge level 107 is much longer than an RF trip time (e.g., the speed of light). Therefore, the measurement error of point-to-point distance for each pairing of the mobile computing device 104 and its connected wireless charging systems 105 will be much lower and result in better location accuracy than using other location techniques.

At block 308, the method 300 may determine the location 119 of the mobile computing device 104. Based on the charging data 113 for the plurality of mobile computing device/wireless charging system pairs, the method may use trilateration to determine a three-dimensional location 119 for the mobile computing device 104. For example, with reference to FIG. 5, the charging data 113 received by the location determination system 110 may indicate the location (e.g., a distance 506 between the mobile computing device 104 and the wireless charging system 105) of the node (e.g., the mobile computing device 104) given the relationship between time 504 to achieve a threshold charge of the battery 147 and the distance of the mobile computing device 104 to the wireless charging system 105, where the charging data 113 includes at least the elapsed time 504 to reach the threshold battery charge level 107. In some embodiments, trilateration may determine absolute or relative locations of points by measurement of distances between the wireless charging system 105 and a connected mobile computing device 104, using the geometry of circles, spheres or triangles. For example, the intersection of three circles or spheres representing the distance from the wireless charging system 105 to the mobile computing device 104 may indicate the location 119 of the mobile computing device 104.

At block 310, the method 300 may use the location determined by block 308 to manage a transaction between one or more nodes of the system 100. In some embodiments, a node of the system 100 may communicate a location 119 of the wireless computing device 104 (as determined at blocks 306 and 308 of the method 300) to another node of the system 100. For example, in some embodiments, the wallet module 150D, location determination system 110, or other component of the system 100 may communicate the location 119 to the browser module 150B, the location based merchant computer system 106 (e.g., the transaction communication module 134) or other node of the system 100. The location 119 may then be used to facilitate a location-based transaction between the nodes of the system 100. In some embodiments, the location 119 corresponds to a product 143A of the product repository 143. The location 119 may then be used to manage or facilitate a transaction 142A between the nodes of the system 100 (e.g., the mobile computing device 104 and the location-based merchant computer system 106).

In further embodiments, block 310 may include the mobile computing device 104 generally and the browser module 150B in particular accessing a merchant website 144 to initiate a location-based transaction. A location-based transaction may include any communication between the nodes of the system 100 that requires determining a precise location 119 for the mobile computing device 104. In some embodiments, a location-based transaction may include a purchase transaction for a location-based product such as tickets within a venue 400 (FIG. 4) including a plurality of wireless charging systems 105 at the location indicated by the location data 119. In other embodiments, a location-based transaction may include pushing media (e.g., marketing data, data for a location-based tour of a site, etc.) to the mobile computing device 104 based on the precise location 119 of the device 104 as determined by the location determination system 110. The method 300 may use the location 119 to identify a product 143A, and a purchase or other transaction between the system 100 nodes may be managed or facilitated.

In a location-based purchase transaction, a venue 400 may employ seat-based pricing rather than zone or block-based pricing. An attendee to an event at the venue 400 may use a mobile computing device 104 to access a ticket purchasing application for the venue 400. Block 310 may include instructions to present a seat selection for purchase through a ticket purchasing application or the wallet module 150D based on the location 119 of the mobile computing device 104 determined by the location determination system 110. Also, a historical site, tourist trail, or other location-based merchant including location-based points of interest or other items that are location-based may employ the location 119 to push media to the mobile computing device 104 when there are a plurality of wireless charging systems 105 within a vicinity of the device 104.

Thus, the embodiments described herein may describe a technical solution to the technical problem of location-based node management in a wireless charging network. The embodiments described herein solve this problem by employing data from a plurality of wireless charging systems within a venue to precisely locate a mobile computing device and then facilitate a transaction that is associated with that precise location. The charging time 504 for each wireless charging system 105 connected to the mobile computing device may be used to determine location rather than RF communication trip times and other location techniques. For example, the time 504 for the connected battery 147 of the mobile computing device 104 to achieve a threshold charge much larger than RF trip time (e.g., the speed of light). Therefore, the measurement error of point-to-point distance for each pairing of the mobile computing device 104 and its connected wireless charging systems 105 will be much lower and result in better location accuracy than using RF trip time techniques. For example, the embodiments may be used to facilitate seat-based pricing within a theater or other venue as the location data may be used to determine an exact seat at which the mobile computing device is present. Also, the precise location may be used to push media or other content associated with the same location to the device.

Figure 6:
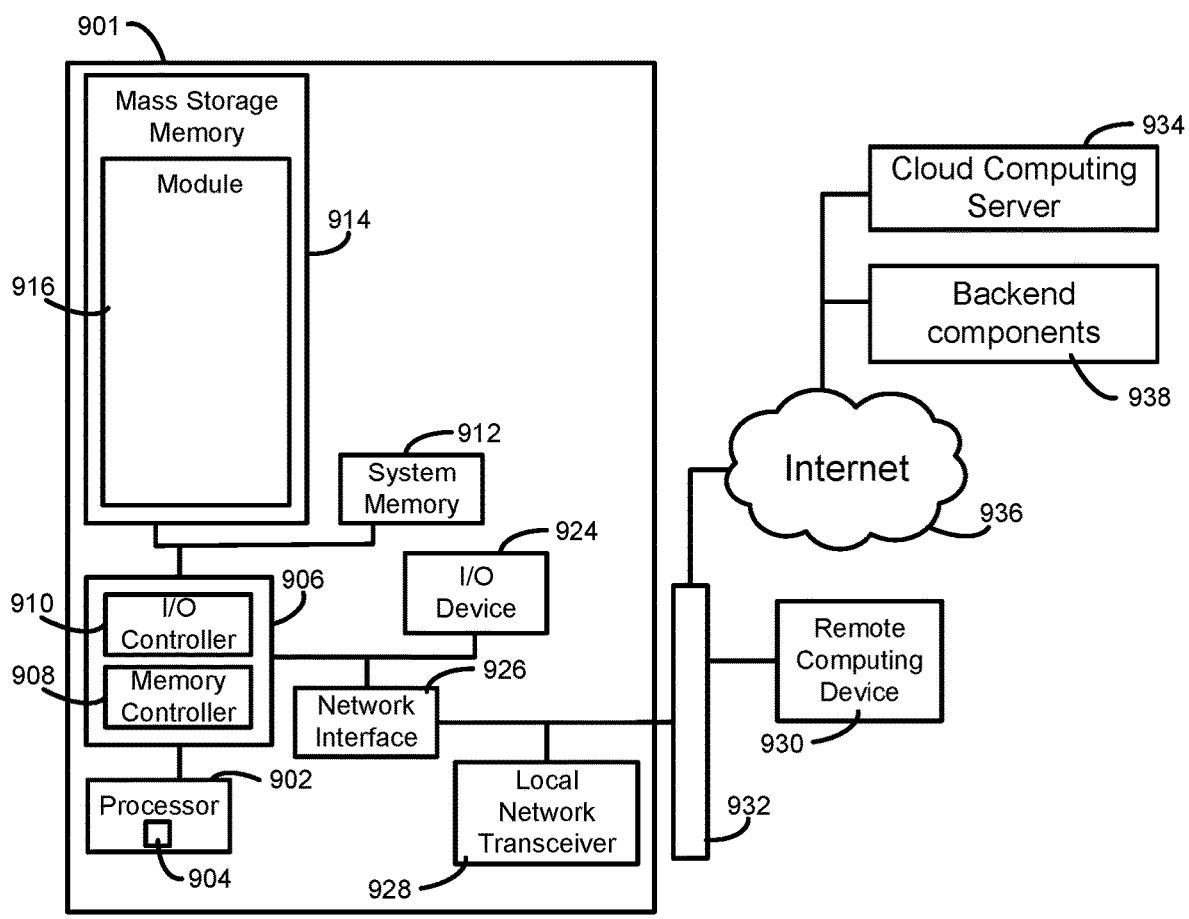
FIG. 6 is an exemplary computing device that is modified to implement the embodiments described herein.

FIG. 6 is a high-level block diagram of an example computing environment 900 for the system 100 and methods (e.g., method 300) as described herein. The computing device 900 may include a server, a mobile computing device, a cellular phone, a tablet computer, a Wi-Fi-enabled device or other personal computing device capable of wireless or wired communication, a thin client, or other known type of computing device (e.g., a mobile computing device 104, a wireless charging system 105, a location-based merchant computer system 106, a payment network system 108, a location determination system 110, and a payment device issuer system 111, etc.). Logically, the computing device 900 may be designed and built to specifically execute certain tasks.

As will be recognized by one skilled in the art, in light of the disclosure and teachings herein, other types of computing devices can be used that have different architectures. Processor systems similar or identical to the example systems and methods described herein may be used to implement and execute the example systems and methods described herein. Although the example system 900 is described below as including a plurality of peripherals, interfaces, chips, memories, etc., one or more of those elements may be omitted from other example processor systems used to implement and execute the example systems and methods. Also, other components may be added.

As shown in FIG. 6, the computing device 901 includes a processor 902 that is coupled to an interconnection bus. The processor 902 includes a register set or register space 904, which is depicted in FIG. 6 as being entirely on-chip, but which could alternatively be located entirely or partially off-chip and directly coupled to the processor 902 via dedicated electrical connections and/or via the interconnection bus. The processor 902 may be any suitable processor, processing unit or microprocessor. Although not shown in FIG. 6, the computing device 901 may be a multi-processor device and, thus, may include one or more additional processors that are identical or similar to the processor 902 and that are communicatively coupled to the interconnection bus.

The processor 902 of FIG. 6 is coupled to a chipset 906, which includes a memory controller 908 and a peripheral input/output (I/O) controller 910. As is well known, a chipset typically provides I/O and memory management functions as well as a plurality of general purpose and/or special purpose registers, timers, etc. that are accessible or used by one or more processors coupled to the chipset 906. The memory controller 908 performs functions that enable the processor 902 (or processors if there are multiple processors) to access a system memory 912 and a mass storage memory 914, that may include either or both of an in-memory cache (e.g., a cache within the memory 912) or an on-disk cache (e.g., a cache within the mass storage memory 914).

The system memory 912 may include any desired type of volatile and/or non-volatile memory such as, for example, static random access memory (SRAM), dynamic random access memory (DRAM), flash memory, read-only memory (ROM), etc. The mass storage memory 914 may include any desired type of mass storage device. For example, the computing device 901 may be used to implement a module 916 (e.g., the various modules as herein described). The mass storage memory 914 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 901, the systems and methods described herein. Thus, a module, block, function, operation, procedure, routine, step, and method can be implemented in hardware, firmware, and/or software. In one embodiment, program modules and routines are stored in mass storage memory 914, loaded into system memory 912, and executed by a processor 902 or can be provided from computer program products that are stored in tangible computer-readable storage mediums (e.g. RAM, hard disk, optical/magnetic media, etc.).

The peripheral I/O controller 910 performs functions that enable the processor 902 to communicate with a peripheral input/output (I/O) device 924, a network interface 926, a local network transceiver 928, (via the network interface 926) via a peripheral I/O bus. The I/O device 924 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O device 924 may be used with the module 916, etc., to receive data from the transceiver 928, send the data to the components of the system 100, and perform any operations related to the methods as described herein. The local network transceiver 928 may include support for a Wi-Fi network, Bluetooth, Infrared, cellular, or other wireless data transmission protocols. In other embodiments, one element may simultaneously support each of the various wireless protocols employed by the computing device 901. For example, a software-defined radio may be able to support multiple protocols via downloadable instructions. In operation, the computing device 901 may be able to periodically poll for visible wireless network transmitters (both cellular and local network) on a periodic basis. Such polling may be possible even while normal wireless traffic is being supported on the computing device 901. The network interface 926 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 908 and the I/O controller 910 are depicted in FIG. 6 as separate functional blocks within the chipset 906, the functions performed by these blocks may be integrated within a single integrated circuit or may be implemented using two or more separate integrated circuits. The computing environment 900 may also implement the module 916 on a remote computing device 930. The remote computing device 930 may communicate with the computing device 901 over an Ethernet link 932. In some embodiments, the module 916 may be retrieved by the computing device 901 from a cloud computing server 934 via the Internet 936. When using the cloud computing server 934, the retrieved module 916 may be programmatically linked with the computing device 901. The module 916 may be a collection of various software playgrounds including artificial intelligence software and document creation software or may also be a Java® applet executing within a Java® Virtual Machine (JVM) environment resident in the computing device 901 or the remote computing device 930. The module 916 may also be a "plug-in" adapted to execute in a web-browser located on the computing devices 901 and 930. In some embodiments, the module 916 may communicate with back end components 938 via the Internet 936.

The system 900 may include but is not limited to any combination of a LAN, a MAN, a WAN, a mobile, a wired or wireless network, a private network, or a virtual private network. Moreover, while only one remote computing device 930 is illustrated in FIG. 6 to simplify and clarify the description, it is understood that any number of client computers are supported and can be in communication within the system 900.

Additionally, certain embodiments are described herein as including logic or a number of components, modules, blocks, or mechanisms. Modules and method blocks may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a processor configured using software, the processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "embodiments," "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A processor-implemented method for managing a transaction between nodes of a system including a plurality of wireless charging systems, the method comprising:
   receiving, by a processor of a network server, charging data corresponding to a mobile computing device, the charging data corresponding to a mobile computing device, the charging data including an elapsed time for a communication module of the mobile computing device to reach a threshold level and to send a response to the plurality of wireless charging systems in response to reaching the threshold level;
   determining, by the processor of the network server, a location of the mobile computing device based on a location for each of the plurality of wireless charging systems, and a relationship between the elapsed time and the threshold level; and
   sending, by the processor of the network server, the location of the mobile computing device to a node of the system to manage a location-based transaction between the mobile computing device and the node of the system based on the location of the mobile computing device;
   wherein the mobile computing device is coupled to the plurality of wireless charging systems.

2. The method of claim 1, wherein the threshold level includes a battery voltage to enable the mobile computing device to respond to the plurality of wireless charging systems.

3. The method of claim 2, wherein the plurality of wireless charging systems includes at least three wireless charging systems and the location-based transaction includes a transaction between the mobile computing device and a location-based merchant computer system using the location of the mobile computing device.

4. The method of claim 3, wherein the elapsed time for the communication module to reach the threshold level includes an elapsed time for the battery of the mobile computing device to reach the threshold level.

5. The method of claim 4, wherein determining the location of the mobile computing device based on the elapsed time for the communication module of the mobile computing device to reach the threshold level further includes determining distances between the mobile computing device to each of the plurality of wireless network systems using the elapsed time for the communication module of the mobile computing device to reach the threshold level.

6. The method of claim 5, wherein determining the location of the mobile computing device based on the elapsed time for the communication module of the mobile computing device to reach the threshold level further includes performing trilateration between the at least three wireless charging systems based on locations for each of the plurality of wireless charging systems and the relationship between the elapsed time for the communication module of the mobile computing device to reach the threshold level and the threshold level.

7. The method of claim 6, wherein managing the location-based transaction between the mobile computing device and the location-based merchant computer system using the location of the mobile computing device includes communicating the location to the location-based merchant computer system.

8. The method of claim 7, wherein the location corresponds to a product of the location based merchant computer system.

9. The method of claim 1, further comprising coordinating, by the processor of the network server, the plurality of wireless charging systems.

10. The method of claim 1, wherein the charging data includes an identification of the mobile computing device.

11. A system for managing a transaction between nodes of the system including a plurality of wireless charging systems, the system comprising:
a processor and a memory in communication with the processor, the memory storing instructions, that when executed by the processor, cause the processor to:
receive charging data corresponding to a mobile computing device, the charging data corresponding to a mobile computing device, the charging data including an elapsed time for a communication module of the mobile computing device to reach a threshold level and to send a response to the plurality of wireless charging systems in response to reaching the threshold level
determine a location of the mobile computing device based a location for each of the plurality of wireless charging systems, and a relationship between the elapsed time and the threshold level;
send the location of the mobile computing device to a node of the system to manage a location-based transaction between the mobile computing device and the node of the system based on the location of the mobile computing device;
wherein the mobile computing device is coupled to the plurality of wireless charging systems.

12. The system of claim 11, wherein the threshold level includes a battery voltage to enable the mobile computing device to respond to the plurality of wireless charging systems.

13. The system of claim 12, wherein the plurality of wireless charging systems includes at least three wireless charging systems, and the location-based transaction includes a transaction between the mobile computing device and a location-based merchant computer system using the location of the mobile computing device.

14. The system of claim 13, wherein the elapsed time for the communication module to reach the threshold level includes an elapsed time for the battery of the mobile computing device to reach the threshold level.

15. The system of claim 14, wherein instructions to determine the location of the mobile computing device based on the elapsed time for the communication module of the mobile computing device to reach the threshold level further includes determining distances between the mobile computing device to each of the plurality of wireless network systems using the elapsed time for the communication module of the mobile computing device to reach the threshold level.

16. The system of claim 15, wherein instructions to determine the location of the mobile computing device based on the elapsed time for the communication module of the mobile computing device to reach the threshold level further includes performing trilateration between the at least three wireless charging systems based on locations for each of the plurality of wireless charging systems and the relationship between the elapsed time for the communication module of the mobile computing device to reach the threshold level and the threshold level.

17. The system of claim 16, wherein managing the location-based transaction between the mobile computing device and the location-based merchant computer system using the location of the mobile computing device includes communicating the location to the location-based merchant computer system.

18. The system of claim 17, wherein the location corresponds to a product of the location based merchant computer system.

19. The system of claim 18, further comprising coordinating, by a network server, the plurality of wireless charging systems.

20. The system of claim 19, wherein the charging data includes an identification of the mobile computing device.

* * * * *